United States Patent Office 3,151,905
Patented Oct. 6, 1964

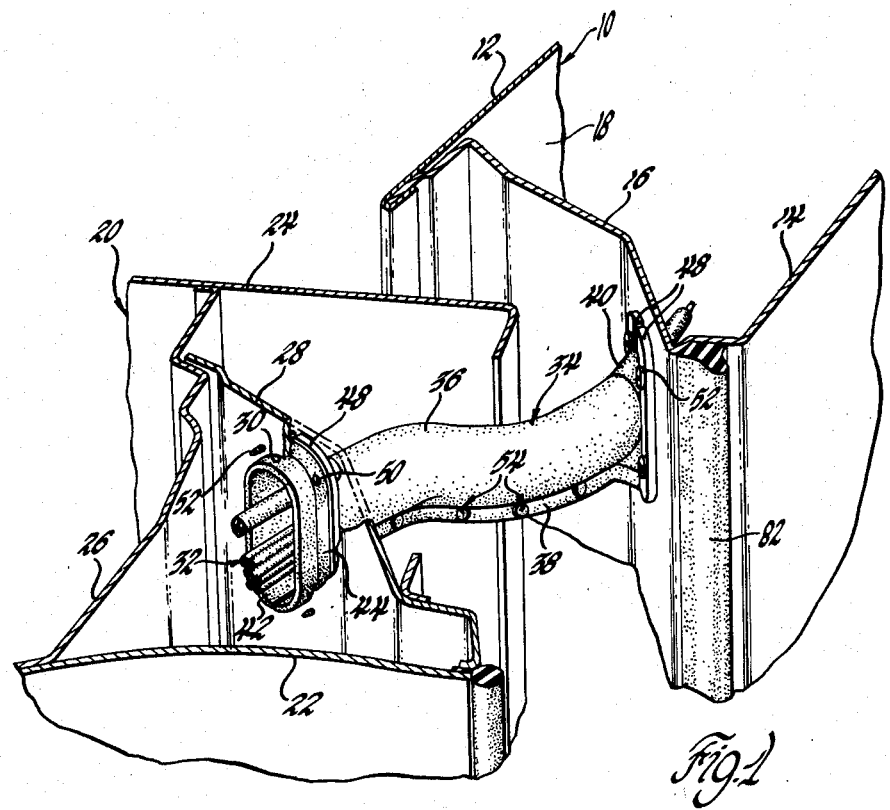

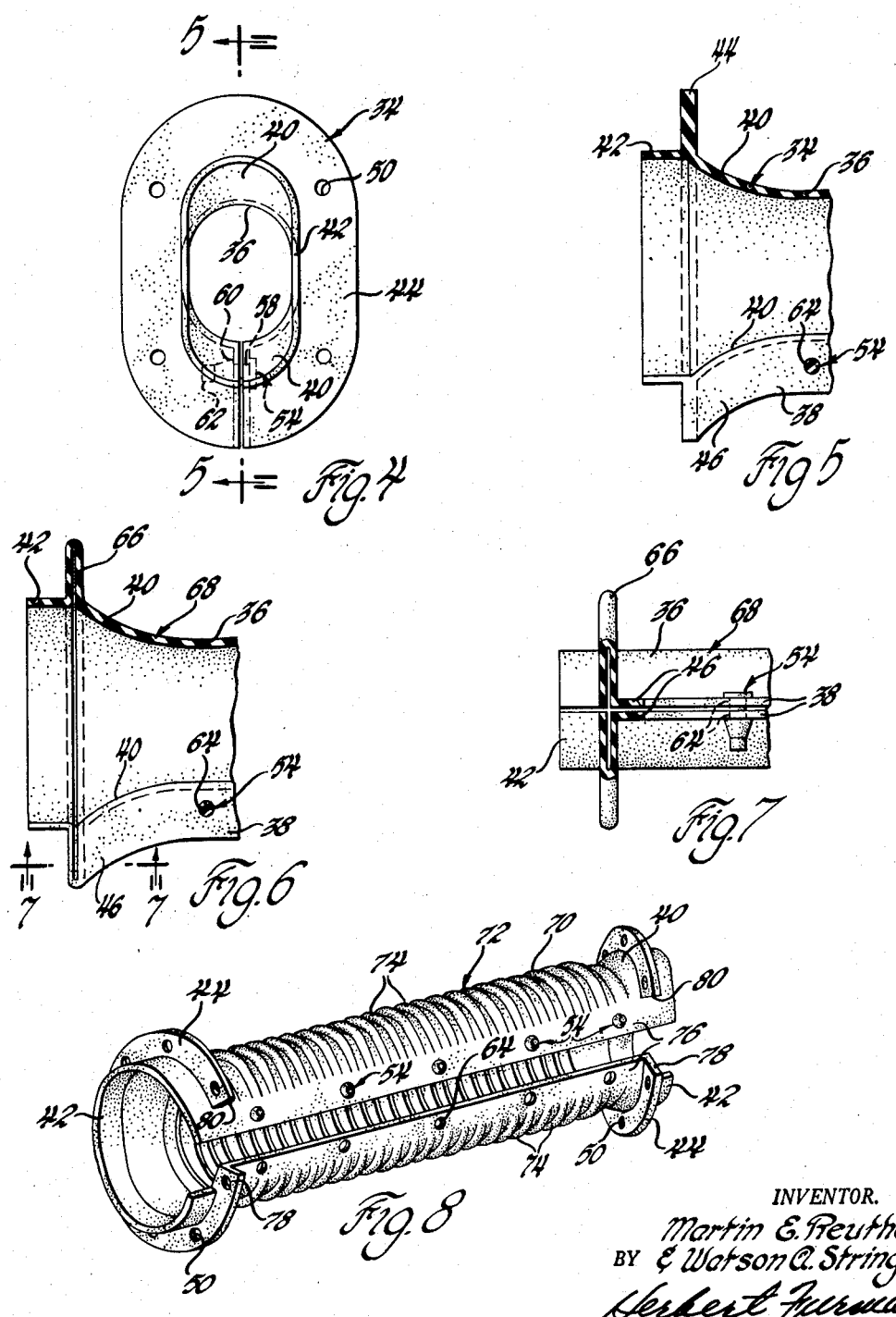

3,151,905
CONDUIT ASSEMBLY
Martin E. Reuther, Detroit, and Watson A. Stringer, Orchard Lake, Mich., assignors to General Motors Corporation, Detroit, Mich., a corporation of Delaware
Filed July 27, 1960, Ser. No. 45,679
2 Claims. (Cl. 296—44)

This invention relates to conduits and more particularly to conduits for interconnecting spaced portions of a vehicle body.

The conduit of this invention is particularly useful for interconnecting a vehicle body pillar and a door to provide both a housing and a protective covering for electric and hydraulic power harnesses extending therebetween.

Such conduits have been used in the past on vehicle bodies but have had certain disadvantages, particularly in the installation thereof on the body. The conduits were usually fixedly mounted at one end thereof within either the door or the pillar and the free end thereof moved inwardly and outwardly within an opening in the other member upon opening and closing movement of the door. Since the conduits were mounted within either the door or the pillar, the conduits were first mounted on the body and then the power harness was fed through the conduit when the harness was mounted on the body. The installation of the conduit within the door or the pillar often required considerable time due to accessibility problems, and the difficulty of feeding the harness through the conduit further required considerable time.

This invention overcomes such disadvantages of prior conduits by providing a conduit which can be mounted on the body and on the pillar over the power harness and in the open positon of the door after the harness has been first fully installed on the body. Thus, the installer works under extremely favorable conditions both in installing the conduit and the harness.

In the preferred embodiment of this invention, the conduit comprises a tube of flexible material which is slit longitudinally thereof. The longitudinal edge portions of the tube are formed into flat-like apertured flanges, which either overlap and abut circumferentially of the body of the tube or whch extend and abut laterally of the body of the tube. The juxtaposed longitudinal flanges are secured together by flexible plug-type buttons which close the tube around the harness after the tube has been first slipped over the harness. A circumferentially extending apertured lateral end flange is provided adjacent each end of the tube, with the ends of the end flanges terminating at and being joined to the longitudinal flanges of the tube, if the latter are of the laterally extending type, or with the ends of one end flange terminating at and being joined to one longitudinally extending flange and the ends of the other end flange terminating at and being joined to the other longitudinally extending flange inwardly of the free edge portion thereof if the longitudinally extending flanges are of the overlapping type. The end flanges bear against the outer surface of both the pillar and the door around the apertures therein and are secured to the pillar and the door by a collar and screw arrangement. The free end portions of the tube extend within both the pillar and within the door and provide guides for feeding the harness through the conduit and also prevent the harness from rubbing against the sometimes sharp metal edge of the apertures within the door and the pillar. Further, the abutting longitudinally extending flanges of the conduit provide a rigidifying backbone or rib for the conduit and cooperate with the end flanges in stiffening the tube in both longitudinal and lateral directions so that the tube can accept both torsional and lateral stresses upon opening and closing movement of the door and yet have a long and useful life.

The primary object of this invention is to provide a new and improved conduit for interconnecting spaced portions of a vehicle body. Another object of this invention is to provide a new and improved conduit for interconnecting spaced portions of a vehicle body and receiving a power harness therethrough, with the conduit being adapted to be mounted on the body over the harness after the harness has been first installed on the body. Yet another object of this invention is to provide a new and improved conduit for interconnecting a vehicle body pillar and a vehicle body door, with the conduit being adapted to be mounted on the body pillar and on the door over a power harness after the power harness has been first fully installed on the body.

These and other objects of this invention will be readily apparent from the following specification and drawings wherein:

FIGURE 1 is a partial perspective view of a portion of a vehicle body pillar and a vehicle body door, with the door being shown in open position, and the door and pillar being interconnected by a conduit according to one embodiment of this invention;

FIGURE 2 is a perspective view of a conduit according to the one embodiment of this invention;

FIGURE 3 is an enlarged view of a portion of FIGURE 2;

FIGURE 4 is an end elevational view of the conduit of FIGURES 1 and 2;

FIGURE 5 is a sectional view taken generally along the plane indicated by line 5—5 of FIGURE 4;

FIGURE 6 is a partial sectional view of a conduit according to another embodiment of this invention;

FIGURE 7 is a sectional view taken generally along the plane indicated by line 7—7 of FIGURE 6; and FIGURE 8 is a perspective view of a conduit according to yet another embodiment of this invention.

Referring now particularly to FIGURE 1, a vehicle body door 10 includes a door outer panel 12, a door inner panel 14, and hinge pillar wall 16 which interconnects panels 12 and 14 and spaces these panels apart with respect to each other to provide a well 18. The body pillar 20 includes an inner pillar member 22, an outer body panel member 24, such as the front fender of the body, an interconnecting brace member 26 between members 22 and 24, and another brace member 28 between members 22 and 26 and defining a compartment therewith. Door 10 is mounted on pillar 20 by suitable hinges, not shown.

Members 28 and 16 are suitably apertured at 30 so as to provide openings therethrough for the reception of a power harness 32, which may comprise electric hydraulic, or other supply lines, which extends between the door and pillar. The door and the pillar are interconnected by a conduit 34 according to this invention which provides both a housing and a guide for the harness 32 in the area intermediate the member 16 and the member 28 when the door 10 is both in an open position, as shown, and in a closed position, not shown.

As shown in FIGURES 1 through 5 of the drawings, conduit 34 generally comprises a tube of flexible rubber-like material, such as natural rubber, synthetic rubber, such as butadiene styrene, butadiene acrylonitrile and polysulfide rubber, rubber-like synthetic resins such as polyurethane rubber, and suitable mixtures of these and other similar materials. The main body portion 36 of the tube is generally of oval cross section and the entire tube is slit longitudinally thereof and provided with flat longitudinally extending-like apertured flanges or edge portions 38 which abut laterally of each other in juxtaposed relationship when the conduit is fully installed. The main body portion 36 of the tube merges into outwardly tapered oppositely disposed oval-like portions 40 adjacent each end thereof which merge with body portion 36 into generally oval-like end portions 42 complementary to the shape of the openings 30 in the door and pillar. A laterally extending end flange 44 extends circumferentially of the tube approximately at the juncture of the tapered portions 40 and the body portion 36 with the end portions 42 as best shown in FIGURE 4. Flanges 44 provide the mounting means for the conduit on both the body and the pillar, as will be further described, and it will be noted that the ends of each flange 44 are joined to the respective end portions 46 of the flanges 38, with these end portions 46 generally following the contour of the tapered portions 40 of the tube.

The conduit 34 is mounted on the body pillar and on the door, in the open position of the latter, after the harness 32 has been first fully installed on the body. In order to install the conduit, the conduit is slipped over the harness 32 and the end portions 42 thereof inserted within the openings 30 in the pillar and the door so that the flanges 44 abut the door and pillar and flanges 38 abut each other. Metal collars 48 fit over the flanges 44, with the collars 48 and the flanges 44 being apertured at 50 for the reception of sheet metal screws 52 which secure the flanges 44 and collar 48 to the member 28 of the pillar and the member 16 of the door. The abutting flanges 38 are secured together by flexible plug-type fastener buttons 54 which may be of the same material as the conduit 34. Each button 54, FIGURE 3, generally comprises a flat head 56, a cylindrical shank 58, a tapered portion 60, and a free end shank 62. In order to mount a button 54 in place, the shank 62 is inserted within an aperture 64 of the flanges 38 and then the button 54 is pushed inwardly of the flanges 38 until the tapered portion 60 passes through the flanges and the flanges are clamped together at the underside of the head 56 and the shoulder between the tapered portion 60 and shank 58.

FIGURES 6 and 7 of the drawings show another embodiment of this invention which is substantially the same as that previously described in conjunction with FIGURES 1 through 5 except that the end flanges 66 thereof are of double wall construction, all other parts of this conduit 68 being the same as the conduit 34 previously described whereby like numerals have been used for like parts.

FIGURE 8 shows yet another embodiment of this invention which is also similar to the conduit 34 previously described except that the body portion 70 of this conduit 72 includes a number of spaced circumferentially extending ribs 74 which terminate at the longitudinally extending flanges or edge portions 76 of the tube and are located intermediate the tapered portions 40 thereof. The ribs 74 provide the body portion 70 with a bellows type action upon opening and closing movement of the door. Further, it will be noted that the flanges 76 in this embodiment of the invention do not extend laterally of the body portion 70 but, rather, extend circumferentially thereof so that these flanges abut in an overlapping relationship when secured together rather than in a laterally extending relationship as do the flanges 38 of the conduit 34. Since the flanges 76 overlap circumferentially, one end portion 78 of each end flange 44 extends to the outer edge of one of the flanges 76 while the other end portion 80 of each flange 44 terminates at the inner edge portion of the other flange 76 so that the end portions 78 and 80 can abut each other when the flanges 76 are overlapped. The flanges 76 are secured together by the same fasteners 54 described in conjunction with the first embodiment of this invention, and the conduit 72 is mounted on the door and on the pillar in the same manner.

Although the conduit 34 has been shown and described as having laterally extending flanges 38, it will be appreciated, of course, that this embodiment of the invention can be provided with the circumferentially extending overlapping flanges 76 of the conduit 72, and further that the body portion 36 of the conduit 34 may be provided with the ribs 74 to give conduit 34 a bellows-type action if so desired. The reverse is also true, so that the conduit 72 may be provided with flanges similar to the flanges 38, rather than the flanges 76, and the same is also true of the conduit 68. Accordingly, each embodiment of the invention may be provided with parts or portions of the other embodiments of the invention if so desired.

It should also be noted, with reference to FIGURE 1 of the drawings, that the door weatherstrip 82 is inboard of the conduit 34 and accordingly cannot act as a seal for the apertures 30 in the door and in the member 28. However, the flanges 44 of the conduit 34 and the collars 48 effectively prevent any entry of moisture into the interior of the door 10, and into the interior of the pillar structure defined by the members 22, 26, and 28. This is another feature of the conduit assembly of this invention which represents a distinctive advantage over prior conduits.

Thus, the invention provides a new and improved conduit for interconnecting spaced portions of a vehicle body, with the conduit being able to be mounted on the body over a power harness after the harness has been first installed on the body.

We claim:

1. In combination with a vehicle body including a spaced pair of body members, one being mounted on the other for movement relative thereto, and a power harness extending between said body members and preassembled therewith, a conduit assembly providing a housing for said power harness comprising, in combination, an elongated tubular member of flexible material having a longitudinal slit therein so as to be slipped over said preassembled power harness, the longitudinal edge portions of said tubular member being located in abutting relationship after said tubular member has been slipped over said power harness, fastener means removably securing said edge portions together to close said tubular member around said power harness and provide a rigidifying backbone for said tubular member, an annular laterally extending mounting flange located adjacent each end of said tubular member and formed integrally therewith, said mounting flanges interconnecting and rigidifying the longitudinal edge portions of said tubular member, each mounting flange laterally abutting one of said body members adjacent an opening therein provided for the passage of the power harness therethrough, means securing said lateral flanges to said body members to mount said tubular member thereon, said tubular member loosely surrounding said power harness, and said power harness and said tubular member being flexible independently of each other upon movement of said one body member relative to said other body member.

2. In combination with a vehicle body including a closure member swingably mounted on a body member for movement between open and closed positions relative thereto, and a power harness extending between said closure and body members and preassembled therewith, a conduit assembly providing a housing for said power harness comprising, in combination, an elongated tubular member of flexible material having a longitudinal slit therein, said tubular member being slipped over said preassembled power harness in the open position of said closure member, the longitudinal edge portions of said tubular member being located in abutting relationship after said tubular member has been slipped over said power harness, fastener means removably securing said edge portions together to close said tubular member around said power harness and provide a rigidifying backbone for said tubular member, an annular laterally extending mounting flange located adjacent each end of said tubular member and formed integrally therewith, said mounting flanges interconnecting and rigidifying the longitudinal edge portions of said tubular member, each mounting flange laterally abutting one of said body members adjacent an opening therein provided for the passage of the power harness therethrough, means securing said lateral flanges to said body members to mount said tubular member thereon, said tubular member loosely surrounding said power harness, and said power harness and said tubular member being flexible independently of each other upon movement of said one body member relative to said other body member.

References Cited in the file of this patent

UNITED STATES PATENTS

| | | |
|---|---|---|
| 169,760 | Baker | Nov. 9, 1875 |
| 427,658 | Bayles | May 13, 1890 |
| 1,770,212 | Lewis | July 8, 1930 |
| 2,550,021 | Rappl | Apr. 24, 1951 |
| 2,582,249 | Hendel | Jan. 15, 1952 |